United States Patent
Niemela et al.

(10) Patent No.: US 12,010,737 B2
(45) Date of Patent: Jun. 11, 2024

(54) SIGNALLING TO SUPPORT DELAYED SERVICE AVAILABILITY

(71) Applicant: NOKIA SOLUTIONS AND NETWORKS OY, Espoo (FI)

(72) Inventors: Kari Juhani Niemela, Oulu (FI); Jussi-Pekka Koskinen, Oulu (FI); Hannu Petri Hietalahti, Kiviniemi (FI)

(73) Assignee: Nokia Solutions and Networks Oy, Espoo (FI)

( * ) Notice: Subject to any disclaimer, the term of this patent is extended or adjusted under 35 U.S.C. 154(b) by 350 days.

(21) Appl. No.: 17/284,865

(22) PCT Filed: Oct. 15, 2018

(86) PCT No.: PCT/EP2018/078052
§ 371 (c)(1),
(2) Date: Apr. 13, 2021

(87) PCT Pub. No.: WO2020/078528
PCT Pub. Date: Apr. 23, 2020

(65) Prior Publication Data
US 2021/0385884 A1    Dec. 9, 2021

(51) Int. Cl.
*H04W 72/20* (2023.01)
*H04W 76/10* (2018.01)
*H04W 76/38* (2018.01)

(52) U.S. Cl.
CPC ........... *H04W 76/10* (2018.02); *H04W 76/38* (2018.02); *H04W 72/20* (2023.01)

(58) Field of Classification Search
CPC ...... H04W 76/10; H04W 76/38; H04W 72/20
(Continued)

(56) References Cited

U.S. PATENT DOCUMENTS

| | | |
|---|---|---|
| 9,198,216 B2 | 11/2015 | Fan |
| 2013/0201823 A1 | 8/2013 | Gupta |

(Continued)

FOREIGN PATENT DOCUMENTS

| | | |
|---|---|---|
| CN | 103139931 A | 6/2013 |
| CN | 104685952 A | 6/2015 |

(Continued)

OTHER PUBLICATIONS

"3rd Generation Partnership Project; Technical Specification Group Core Network and Terminals; Mobile radio interface Layer 3 specification; Core network protocols; Stage 3 (Release 15)", 3GPP TS 24.008 v15.4.0, (Sep. 2018), 790 pages.

(Continued)

*Primary Examiner* — Dang T Ton
(74) *Attorney, Agent, or Firm* — Barta Jones, PLLC

(57) ABSTRACT

A base station includes a receiver configured to receive, from a user equipment, a request to establish a service to the base station. The base station also includes a processor configured to determine, in response to receiving the request, whether the request is serviceable within a default time interval. The base station further includes a transmitter configured to transmit an acknowledgment comprising information indicating an extended time interval in response to the base station determining that the extended time interval is needed to successfully complete the request. The user equipment includes a receiver configured to receive the acknowledgment from the base station. The user equipment also includes a timer configured to start and run for a default time in response to transmission of the request. The timer is modified in response to receiving the information indicating the extended time interval.

19 Claims, 8 Drawing Sheets

(58) Field of Classification Search
USPC .................. 370/329, 400, 401, 395, 403
See application file for complete search history.

(56) References Cited

U.S. PATENT DOCUMENTS

| | | |
|---|---|---|
| 2013/0324141 A1 | 12/2013 | Jung et al. |
| 2014/0136709 A1 | 5/2014 | Chin et al. |
| 2015/0045036 A1 | 2/2015 | Matin et al. |
| 2020/0169972 A1* | 5/2020 | Marce .................. H04L 47/283 |

FOREIGN PATENT DOCUMENTS

| | | |
|---|---|---|
| EP | 2 140 719 A2 | 1/2010 |
| KR | 20160140262 A | 12/2016 |
| WO | WO 2008/116128 A2 | 9/2008 |
| WO | WO 2012/159071 A1 | 11/2012 |
| WO | WO 2013/188591 A1 | 12/2013 |

OTHER PUBLICATIONS

"3rd Generation Partnership Project; Technical Specification Group Core Network and Terminals; Non-Access-Stratum (NAS) protocol for Evolved Packet System (EPS); Stage 3 (Release 15)", 3GPP TS 24.301 v15.4.0, (Sep. 2018), 530 pages.

"3rd Generation Partnership Project; Technical Specification Group Services and System Aspects; Study on Cellular IoT Support and Evolution for the 5G System (Release 16)", 3GPP TR 23.724 v0.3.0, (Apr. 2018), 157 pages.

"Network Functions Virtualisation (NFV); Service Quality Metrics", ETSI GS NFV-INF 010 v1.1.1, (Dec. 2014), 27 pages.

Huawei et al., "Introduction of EDT for eMTC and NB-IoT Enhancements in TS 36.300", 3GPP TSG-RAN2 Meeting #101bis, R2-1806519, (Apr. 16-20, 2018), 12 pages.

Institute for Information Industry (III), "CN Overload Control by Extending Access Timer", 3GPP TSG-RAN WG2 #73, R2-111348, (Feb. 21-25, 2011), 8 pages.

International Search Report and Written Opinion for International Application No. PCT/EP2018/078052 dated May 24, 2019, 12 pages.

Machen et al., "Live Service Migration in Mobile Edge Clouds", IEEE Wireless Communications, vol. 25, Issue 1, (Aug. 3, 2017), 8 pages.

Vaidya et al, "Network Congestion Control: Mechanisms for Congestion Avoidance and Recovery", ACWR '11: Proceedings of the 1st International Conference on Wireless Technologies for Humanitarian Relief, (Dec. 2011), pp. 199-207.

First Examination Report for Indian Application No. 202147020706 dated Feb. 23, 2022, 6 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300, V15.0.0, Dec. 2017, pp. 1-337.

"Msc-generator", Sourceforge, Retrieved on Dec. 11, 2023, Webpage available at : https://sourceforge.net/projects/msc-generator/.

Office Action received for corresponding European Patent Application No. 18789759.0, dated Apr. 13, 2023, 6 pages.

Office Action received for corresponding Chinese Patent Application No. 201880100098.4, dated Nov. 10, 2023, 8 pages of Office Action and no page of translation available.

* cited by examiner

SIGNALLING TO SUPPORT DELAYED SERVICE AVAILABILITY

CROSS-REFERENCE TO RELATED APPLICATIONS

This application is a national phase entry of International Application No. PCT/EP2018/078052, filed Oct. 15, 2018, the entire contents of which are incorporated herein by reference.

BACKGROUND

User equipment in a wireless communication system transmit different types of requests for service to corresponding eNodeBs, radio access networks (RANs), access points, or other devices, which are collectively referred to herein as "base stations." For example, the user equipment can transmit a request to a RAN for connectionless service that includes uplink data for transmission to a core network. For another example, early data transfer (EDT) allows a user equipment to transmit a radio resource control (RRC) connection request to an eNodeB. The RRC connection request includes uplink data for transmission to a gateway to an external network such as a serving gateway (SGW). For yet another example, a user equipment transmits a request to establish (or migrate) a service provided by a virtualized network. The base station responds to the request with an acknowledgment message. Examples of the acknowledgment message include a RAN acknowledgment to a request for uplink transmission of connectionless data, a random access response to a random-access preamble transmitted by user equipment in EDT, an acknowledgment or rejection message in response to an RRC connection request, and the like. The user equipment implements a guard timer that is started when transmitting a request. The user equipment abandons the request and considers it failed after the expiration of the timer.

SUMMARY OF EMBODIMENTS

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In some embodiments, a base station is provided. Some embodiments of the base station include a receiver configured to receive, from a user equipment, a request to establish a service to the base station and a processor configured to determine, in response to receiving the request, whether the request is serviceable within a default time interval. Some embodiments of the base station include a transmitter configured to transmit an acknowledgment including information indicating an extended time interval in response to the base station determining that the extended time interval is needed to successfully complete the request.

Some embodiments of the base station include a memory to store configuration information. The processor is configured to determine whether the request is serviceable within the default time interval by determining whether the memory has stored configuration information that is used to service the request.

Some embodiments of the base station use configuration information that includes state information that defines a data path to a user plane function or context information for the user equipment.

Some embodiments of the base station include a processor that determines whether the request is serviceable within the default time interval by determining whether congestion is present in a network including the base station or whether additional resources are necessary to service the request.

Some embodiments of the base station include a processor that determines whether the request is serviceable within the default time interval by determining whether data is to be retrieved from another network entity to service the request.

Some embodiments of the base station include a transmitter that transmits an acknowledgment including a notification that the servicing of the request is in progress, information that is used to set or modify a value of a timer implemented in the user equipment, or information indicating that the base station will subsequently transmit a notification to the user equipment when the base station is ready to service the request.

In some embodiments, the information indicating the extended time interval includes an indication of a new value of a timer implemented in the user equipment that is to replace a default value of the timer, an offset that is added to increment the default value of the timer, a multiplier that is applied to the value of the timer, or information indicating that the user equipment is to release a requested connection and wait for a reconnection after a time interval.

Some embodiments of the base station include a transmitter that transmits an acknowledgment indicating the default time interval in response to the processor determining that the request will be completed within the default time.

In some embodiments, a user equipment is provided. Some embodiments of the user equipment include a transmitter configured to transmit a request to establish a service to a base station and a receiver configured to receive an acknowledgment comprising information indicating an extended time interval in response to the base station determining that the extended time interval is needed to successfully complete the request. Some embodiments of the user equipment include a timer configured to start and run for a default time interval in response to transmission of the request. The timer is modified in response to receiving the information indicating the extended time interval.

Some embodiments of the user equipment include a timer that is modified in response to configuration information that is used to service the request not being stored in the base station.

In some embodiments, the configuration information includes state information that defines a data path to a user plane function or context information for the user equipment.

Some embodiments of the user equipment include a timer that is modified in response to the base station determining that congestion is present in a network including the base station or additional resources are necessary to service the request.

Some embodiments of the user equipment include a timer that is modified in response to the base station determining that data is to be retrieved from another network entity to service the request.

Some embodiments of the user equipment include a receiver that receives an acknowledgment including a notification that the servicing of the request is in progress, information that is used to set or modify a value of a timer implemented in the user equipment, or information indicating that the base station will subsequently transmit a notification to the user equipment when the base station is ready to service the request.

In some embodiments of the user equipment, the information indicating the extended time interval includes an indication of a new value of the timer that is to replace a default value of the timer, an offset that is added to increment the default value of the timer, a multiplier that is applied to the value of the timer, or information indicating that the user equipment is to release a requested connection and wait for a reconnection after a time interval.

Some embodiments of the user equipment include a receiver that receives an acknowledgment indicating the default time interval in response to determining that the request will be completed within the default time.

In some embodiments, an apparatus includes one or more processors and one or more memories including computer program code. The at one or more memories and the computer program code are configured to, with the one or more processors, cause the apparatus at least to perform receiving, from a user equipment, a request to establish a service to a base station. The one or more memories and the computer program code are also configured to cause the one or more processors to determine, in response to receiving the request, whether the request is serviceable within a default time interval. The one or more memories and the computer program code are also configured to cause the one or more processors to transmit an acknowledgment comprising information indicating an extended time interval in response to the base station determining that the extended time interval is needed to successfully complete the request.

Some embodiments of the apparatus are implemented in a base station.

In some embodiments, an apparatus includes one or more processors and one or more memories including computer program code. The one or more memories and the computer program code are configured to, with the one or more processors, cause the apparatus at least to perform transmitting a request to establish a service to a base station and receiving an acknowledgment including information indicating an extended time interval in response to the base station determining that the extended time interval is needed to successfully complete the request. The one or more memories and the computer program code are also configured to cause the apparatus to perform configuring a timer to start and run for a default time in response to transmission of the request. The timer is modified in response to receiving the information indicating the extended time interval.

Some embodiments of the apparatus are implemented in the user equipment.

Some embodiments of an apparatus include means for receiving, from a user equipment, a request to establish a service to a base station. The apparatus also includes means for determining, in response to receiving the request, whether the request is serviceable within a default time interval. The apparatus further include means for transmitting an acknowledgment comprising information indicating an extended time interval in response to the base station determining that the extended time interval is needed to successfully complete the request.

Some embodiments of the apparatus include means for storing configuration information and means for determining whether the request is serviceable within the default time interval by determining whether the stored configuration information is used to service the request.

Some embodiments of the apparatus include means for determining whether the request is serviceable within the default time interval by determining whether congestion is present in a network including the base station or whether additional resources are necessary to service the request.

Some embodiments of the apparatus include means for determining whether the request is serviceable within the default time interval by determining whether data is to be retrieved from another network entity to service the request.

Some embodiments of the apparatus include means for transmitting an acknowledgment including a notification that the servicing of the request is in progress, information that is used to set or modify a value of a timer implemented in the user equipment, or information indicating that the base station will subsequently transmit a notification to a user equipment when a base station is ready to service the request.

In some embodiments, the information indicating the extended time interval includes an indication of a new value of a timer implemented in the user equipment that is to replace a default value of the timer, an offset that is added to increment the default value of the timer, a multiplier that is applied to the value of the timer, or information indicating that the user equipment is to release a requested connection and wait for a reconnection after a time interval.

Some embodiments of the apparatus include means for transmitting an acknowledgment indicating the default time interval in response to determining that the request will be completed within the default time.

Some embodiments of an apparatus include means for transmitting a request to establish a service to a base station and receiving an acknowledgment including information indicating an extended time interval in response to determining that the extended time interval is needed to successfully complete the request. Some embodiments of the apparatus include means for configuring a timer to start and run for a default time in response to transmission of the request. The timer is modified in response to receiving the information indicating the extended time interval.

Some embodiments of the apparatus include means for modifying the timer in response to configuration information that is used to service the request not being stored in the base station.

In some embodiments, the configuration information includes state information that defines a data path to a user plane function or context information for the user equipment.

Some embodiments of the apparatus include means for modifying the timer in response determining that congestion is present in a network including the base station or additional resources are necessary to service the request.

Some embodiments of the apparatus include means for modifying the timer in response to determining that data is to be retrieved from another network entity to service the request.

Some embodiments of the apparatus include means for receiving an acknowledgment including a notification that the servicing of the request is in progress, information that is used to set or modify a value of a timer implemented in the user equipment, or information indicating that the base station will subsequently transmit a notification to the user equipment when the base station is ready to service the request.

In some embodiments, the information indicating the extended time interval includes an indication of a new value of the timer that is to replace a default value of the timer, an offset that is added to increment the default value of the timer, a multiplier that is applied to the value of the timer, or information indicating that the user equipment is to release a requested connection and wait for a reconnection after a time interval.

Some embodiments of the apparatus include means for receiving an acknowledgment indicating the default time interval in response to determining that the request will be completed within the default time.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
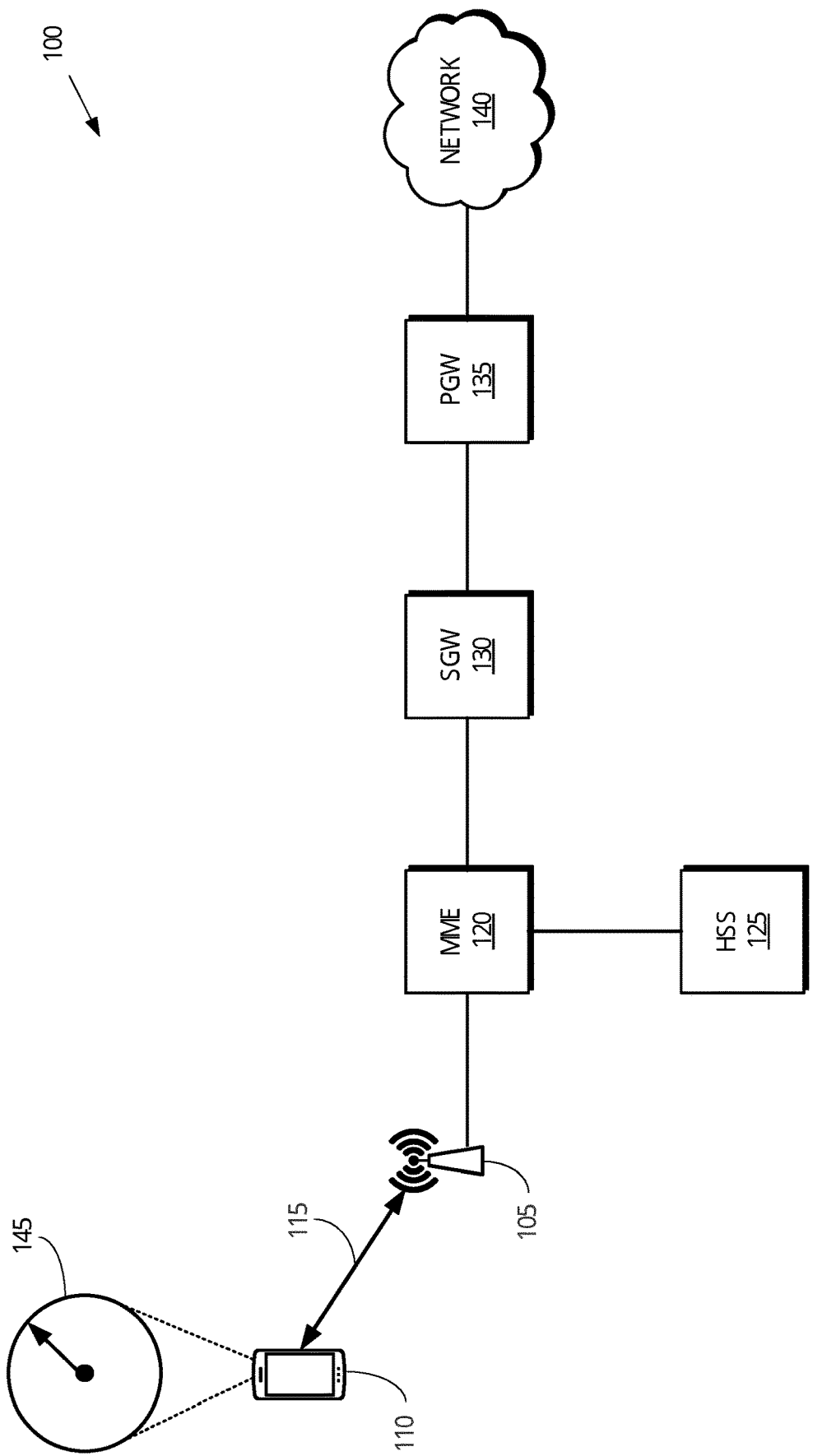
FIG. 1 is a block diagram of a wireless communication system that operates according to the Long Term Evolution (LTE) standards defined by the Third Generation Partnership Project (3GPP) according to some embodiments.

Default durations of guard timers are typically set to values that balance the competing demands to provide the user equipment with access to the radio interface resources for useful data communication and to prevent the user equipment from monopolizing resources at the radio interface for extended time intervals. For example, the duration of the timer is typically set to a relatively short default value that corresponds to an expected or average delay between transmitting the request and receiving an acknowledgment from the base station. However, in certain cases the actual amount of time required to establish a service in response to a request from a user equipment exceeds the duration of the default timer, even though the base station successfully received the request and will eventually be able to provide the requested service. The user equipment may therefore unnecessarily abandon the request if the default timer expires before the base station is able to service the request. For example, the latency required to establish (or migrate) a service provided by a virtual network can vary significantly depending on the resources required for the virtualization technique (e.g., a virtual machine or container) and the size of the application. For another example, a user equipment will abandon an RRC connection attempt if the default timer expires while the base station is waiting for data retrieval from another node in the network. For yet another example, the user equipment abandons a request for connectionless service if delays in retrieving a data path to a user plane function (UPF) that provides services to the user equipment exceed the duration of the default timer. One potential solution to this problem is for the base station to wait to acknowledge the request for the service until the base station determines (or guesses) whether it will be able to provide the requested service. However, the user equipment is not able to determine whether it should apply the shorter default timer or wait for a longer time interval. Simply configuring the user equipment to wait for a longer time interval could lead to the user equipment monopolizing the resources at the radio interface unnecessarily in error and failure cases.

FIGS. 1-8 disclose techniques that balance competing demands to (1) limit the amount of time user equipment hold resources of an air interface while waiting to establish a service under normal conditions and (2) provide the user equipment sufficient time to establish services that require additional set up latency. User equipment are selectively notified of a default time interval or an extended time interval to establish a service requested by the user equipment. The user equipment transmits a request to establish a service to a base station. In response to receiving the request, the base station determines whether the request is serviceable within the default time interval or the extended time interval is needed to successfully complete the request. Some embodiments of the base station determine whether the request is serviceable within the default or extended time interval by determining whether the base station has stored configuration information that is used to service the request. Examples of the configuration information include state information defining a data path to a network entity such as a user plane function (UPF), context information for the user equipment, and the like. Some embodiments of the base station determine whether the request is serviceable within the default or extended time interval by determining whether congestion is present in the network or additional resources are necessary to service the request. Some embodiments of the base station determine whether the request is serviceable within the default or extended time interval by determining whether data is to be retrieved from another network entity.

If the request is serviceable within the default time interval, the base station sends an acknowledgment to the user equipment including information indicating the default time interval. Otherwise, the base station sends an acknowledgment that indicates that the request requires an extended time interval. The acknowledgment that indicates that the request requires an extended time interval can include a notification that the service request is "in progress," information that is used to set or modify a value of a timer implemented in the user equipment, or information indicating that the base station will transmit a notification to the user equipment when the base station is ready to service the request so that the user equipment can disconnect and subsequently transmits a new request. The acknowledgment is transmitted from the base station using broadcast or dedicated signaling. Examples of the information indicating the extended time interval include an indication of a new value of the timer that is to replace the value of the timer implemented in the user equipment, an offset that is added to increment the user equipment timer, a multiplier that is applied to the value of the user equipment timer, and information indicating that the user equipment is to release the connection and wait for a reconnection after a time interval. The user equipment then takes the action indicated in the acknowledgment, e.g., modifying the timer or releasing the connection for the specified time interval.

FIG. 1 is a block diagram of a wireless communication system 100 that operates according to the Long Term Evolution (LTE) standards defined by the Third Generation Partnership Project (3GPP) according to some embodiments. Although the wireless communication system 100 shown in FIG. 1 is described in terms of the LTE standards, other embodiments of the wireless communication system 100 operate according to other standards or protocols. The wireless communication system 100 includes one or more base stations 105 that provide wireless connectivity to one or more user equipment 110 over corresponding air interfaces 115. The wireless communication system 100 selectively modifies timer values to account for delays in establishing connections between the base stations 105 and the user equipment 110 over the air interface 115, as discussed below. Dynamic modification of timer values is also implemented to account for delays in establishing connections over other interfaces in some embodiments of the wireless communication system 100.

The wireless communication system 100 includes a mobility management entity (MME) 120 that is connected to the base station 105. The MME 120 is responsible for paging the user equipment 110 when the user equipment 110 is in an idle mode. The MME 120 also participates in bearer activation/deactivation and authenticating the user equipment 110 using information stored in a home subscriber server (HSS) 125, which is a central database that contains user-related and subscription-related information. The MME 120 terminates non-access stratum (NAS) signaling and generates temporary identifiers for the user equipment 110. The MME 120 is also the termination point in the wireless communication system 100 for ciphering/integrity protection for NAS signaling and the MME 120 handles the security key management. The MME 120 also performs other functions such as lawful interception of signaling, control plane functionality for mobility between LTE and 2G/3G access networks, and the like.

The wireless communication system 100 includes a serving gateway (SGW) 130 that routes and forwards user data packets and acts as the mobility anchor for the user plane during handovers between base stations including the base station 105. The SGW 130 terminates the downlink data path and triggers paging when downlink data arrives for the user equipment 110 while the user equipment 110 is in an idle mode. The SGW 130 also manages and stores contexts for the user equipment including parameters of the Internet protocol (IP) bearer service, network internal routing information, and the like.

A packet data node (PDN) gateway (PGW) 135 is connected to the SGW 130. The PGW 135 provides connectivity from the user equipment 110 to external packet data networks such as the network 140 by being the point of exit and entry of traffic for the user equipment 110. The PGW 135 performs policy enforcement, packet filtering for each user, charging support, lawful interception and packet screening, as well as acting as the anchor for mobility between 3GPP and non-3GPP technologies such as WiMAX.

The user equipment 110 sends a request to the base station 105 to establish a service that is provided by the wireless communication system 100 or other service provider via the wireless communication system 100. Conventional 3GPP signaling supports transmission of either an acknowledgment (to indicate the request is successful) or a rejection (to indicate that the request is rejected) in response to receiving the request from the user equipment 110. The user equipment 110 implements one or more timers 145 that are started in response to transmission of the request and countdown for a default time interval. If the timer 145 expires before the user equipment 110 receives the acknowledgment or rejection from the base station 105, the user equipment 110 abandons the request and is required to resubmit the request, perhaps after waiting for a back off interval. If conventional wireless communication systems do not provide any way to indicate that the base station 105 is expected to successfully service the request after a time interval that is longer than the default time interval used to configure the timer 145. For example, there is no dynamic timer handling technique that allows the base station 105 to indicate to the user equipment 110 that the request has been successfully decoded and the base station 105 attempts to serve the request but the foreseen positive outcome is expected to take longer than the default time interval, e.g., due to shortage of resources that need to be obtained from another node or database to serve the request.

Some embodiments of the wireless communication system 100 support transmission of a progress indication to the user equipment 110 that is placed a call using a circuit-switched (CS) call control layer. For example, a PROGRESS packet data unit (PDU) including a Progress indicator information element, as specified in 3GPP TS 24.008, clause 5.56, which is incorporated herein by reference in its entirety. The Progress indicator information element is transmitted to acknowledge to the user equipment 110 that the request to set up the call has been successfully decoded and there are no syntactical errors, but the call routing is expected to take a long time. The Progress indicator forces the user equipment 110 to stop the timer 145 to ensure that the call control protocol timer 145 does not expire prematurely while the network is routing the call. This approach is acceptable in CS call control layer implementations because a user of the user equipment 110 may be prepared to wait while the routing is performed. Moreover, the radio resources for the call are reserved because the request has been evaluated as a valid, chargeable request. However, this approach is not suitable for prolonging the time interval for establishing a radio resource control (RRC) connection, e.g., while the necessary resources or information required to determine whether the request from the user equipment 110 is valid, because these radio resources are not chargeable to the user and it is therefore not acceptable to reserve radio resources for prolonged periods of time if the outcome is that the request is eventually rejected or cannot be served for some other reason. The call control CS domain PROGRESS procedure does not support any way of indicating how much expected time is needed to carry out the request.

Some embodiments of the wireless communication system 100 also include a back off timer, or extended time interval, such as the timers specified in 3GPP TS 24.301, which is incorporated herein by reference in its entirety. In that case, an extended time interval is assigned a value that indicates a duration of a time interval but is still implemented by the user equipment 110 as a static timer having a single value. The user equipment 110 therefore receives the value of the wait timer assigned by the network and uses this value to configure the timer 145. However, the value of the timer 145 is not subsequently modified, e.g., by adding more time in response to detecting congestion, resources that need to be loaded for execution, or data that needs to be retrieved from another node or database. Furthermore, the values of the back off timer are issued to the user equipment 110 at the end of a procedure that is aborted due to an error, failure, or other reason and then the user equipment 110 uses this value to wait for the specified time interval before the next request.

At least in part to address these drawbacks, some embodiments of the base station 105 in the wireless communication system 100 are configured to determine, in response to receiving a request for service from the user equipment 110, whether the request is serviceable within a default time interval. If so, the base station 105 is configured to transmit an acknowledgment to the user equipment 110 that includes information indicating an extended time interval. If not, the base station 105 transmits an acknowledgment to the user equipment 110 that does not include information indicating the extended time interval. Examples of information that is transmitted in the acknowledgments to indicate the extended time interval include, but are not limited to, an indication of a new value of the timer 145 that is to replace a default value of the timer 145, an offset that is added to increment the default value of the timer 145, a multiplier that is applied to the value of the timer 145, and information indicating that the user equipment 110 is to release the connection and wait for a reconnection after a time interval.

Figure 2:
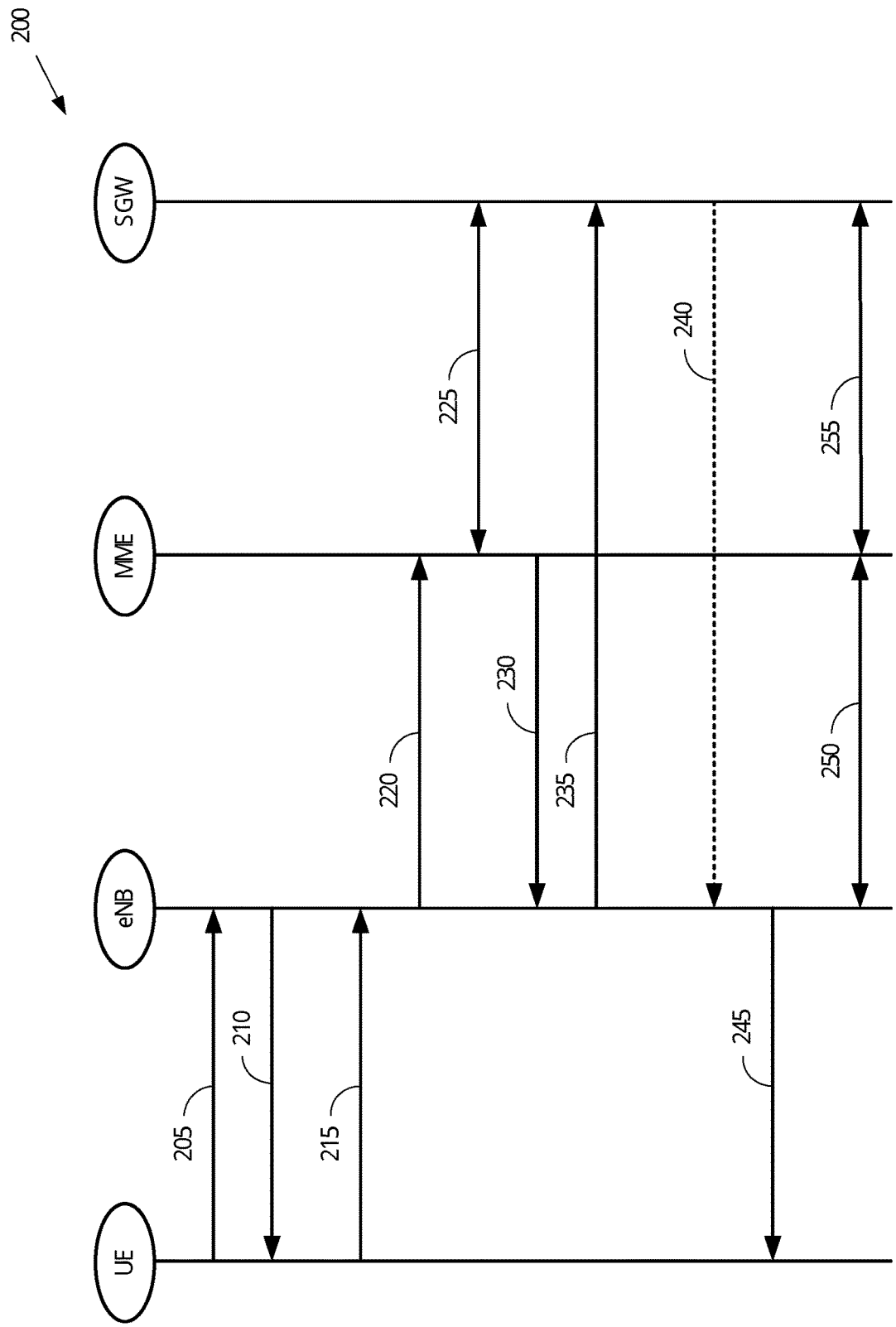
FIG. 2 is a message exchange between entities in a wireless communication system that implements early data transfer (EDT) according to some embodiments.

FIG. 2 is a message exchange 200 between entities in a wireless communication system that implements early data transfer (EDT) according to some embodiments. The message exchange 200 is implemented a wireless communication system such as some embodiments of the wireless communication system 100 shown in FIG. 1. The wireless communication system includes a user equipment (UE) a base station (eNB), and MME, and an SGW.

Some embodiments of the message exchange 200 are implemented according to 3GPP TS 36.300 CR1128, revision 1, which is incorporated herein by reference in its entirety.

The user equipment transmits a random access preamble 205 to the base station, which responds with a random-access response 210 that acknowledges receipt of the random access preamble 205. The user equipment subsequently transmits an RRC connection resume request 215 that includes information such as an identifier of the request 215, a cause associated with the request 215, a media access control (MAC) identifier, and the like. The request 215 also includes a non-access stratum (NAS) payload that includes uplink data that is transmitted according to EDT.

The base station forwards a UE context resume request 220 to the MME, which exchanges messages 225 with the SGW to negotiate modifications to a bearer that is used to convey uplink data from the user equipment. In response to completing the bearer modifications, the MME transmits a UE context resume response 230 to the base station indicating that the bearer is ready to transmit the uplink data. The base station then forwards a message 235 including the uplink data received in the request 215. If downlink data is available for the user equipment, the SGW forwards the downlink data to the base station in a message 240.

The base station transmits an RRC connection release 245 to the user equipment in response to transmitting the uplink data to the user equipment. If downlink data was received from the SGW in the message 240, the base station includes the data in the release 245 that is transmitted to the user equipment. A suspend procedure 250 is performed by the base station and the MME. A modify bearer procedure 255 is performed by the MME and the SGW. Thus, the base station is only able to transmit the RRC connection release 245 to the user equipment after the base station knows the outcome of the request. In some cases, as discussed herein, the base station takes longer than a default time interval to service the request 215, which results in the user equipment disconnecting and subsequently attempting to reconnect to transmit the uplink data.

Figure 3:
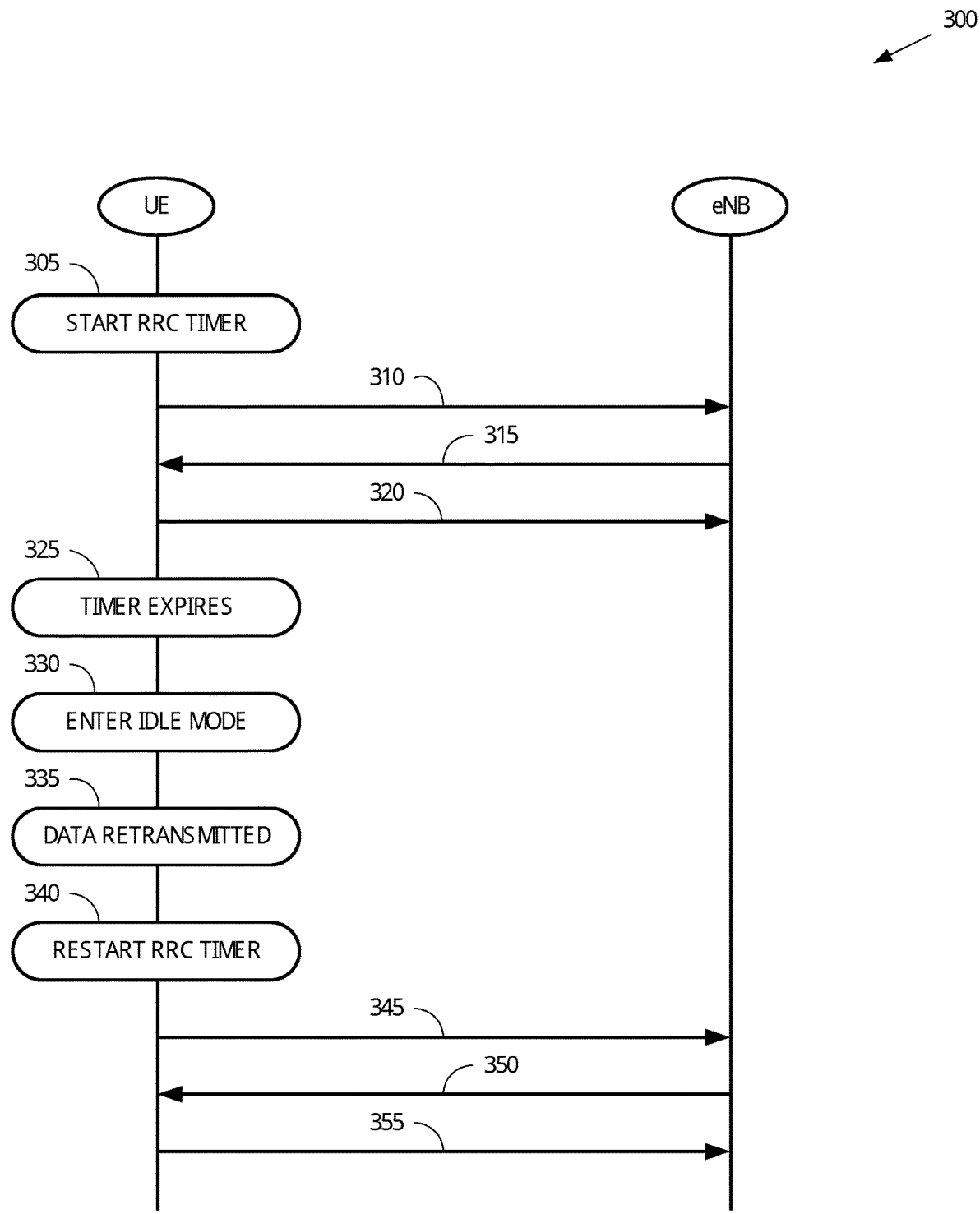
FIG. 3 is a message exchange between entities in a wireless communication system that implements conventional EDT according to some embodiments.

FIG. 3 is a message exchange 300 between entities in a wireless communication system that implements EDT according to some embodiments. The message exchange 300 is implemented a wireless communication system such as some embodiments of the wireless communication system 100 shown in FIG. 1. The wireless communication system includes a user equipment (UE) and a base station (eNB).

The user equipment starts an RRC timer at block 305 in conjunction with transmitting a random-access preamble 310 to the base station to request service from the base station. In response to receiving the random-access preamble 310, the base station transmits a random-access response 315 to the user equipment, which transmits an RRC connection resume request 320 to the base station. The request 320 includes uplink data for transmission to the network by the base station in accordance with conventional EDT.

In the illustrated embodiment, the base station is unable to service the request 320 within a default time interval measured by the time are implemented in the user equipment. As discussed herein, the base station may be unable to service the request 320 within the default time interval for different reasons including delays caused by requesting context information or other resources needed to service the request 320. The timer therefore expires at block 325 and the user equipment enters the idle mode at block 330.

Since the user equipment was unable to transmit the uplink data included in the request 320, the user equipment determines (at block 335) that the uplink data is to be retransmitted. The user equipment therefore restarts the RRC timer at block 340 and transmits another random-access preamble 345 to the base station. In response to receiving the random-access preamble 345, the base station transmits another random-access response 350 to the user equipment, which transmits an RRC connection resume request 355 to the base station. The request 355 includes the uplink data for transmission to the network by the base station in accordance with EDT. Significant latency is therefore introduced by the requirement of the user equipment abandon the request 320 in response to the timer expiring after the default time interval.

Figure 4:
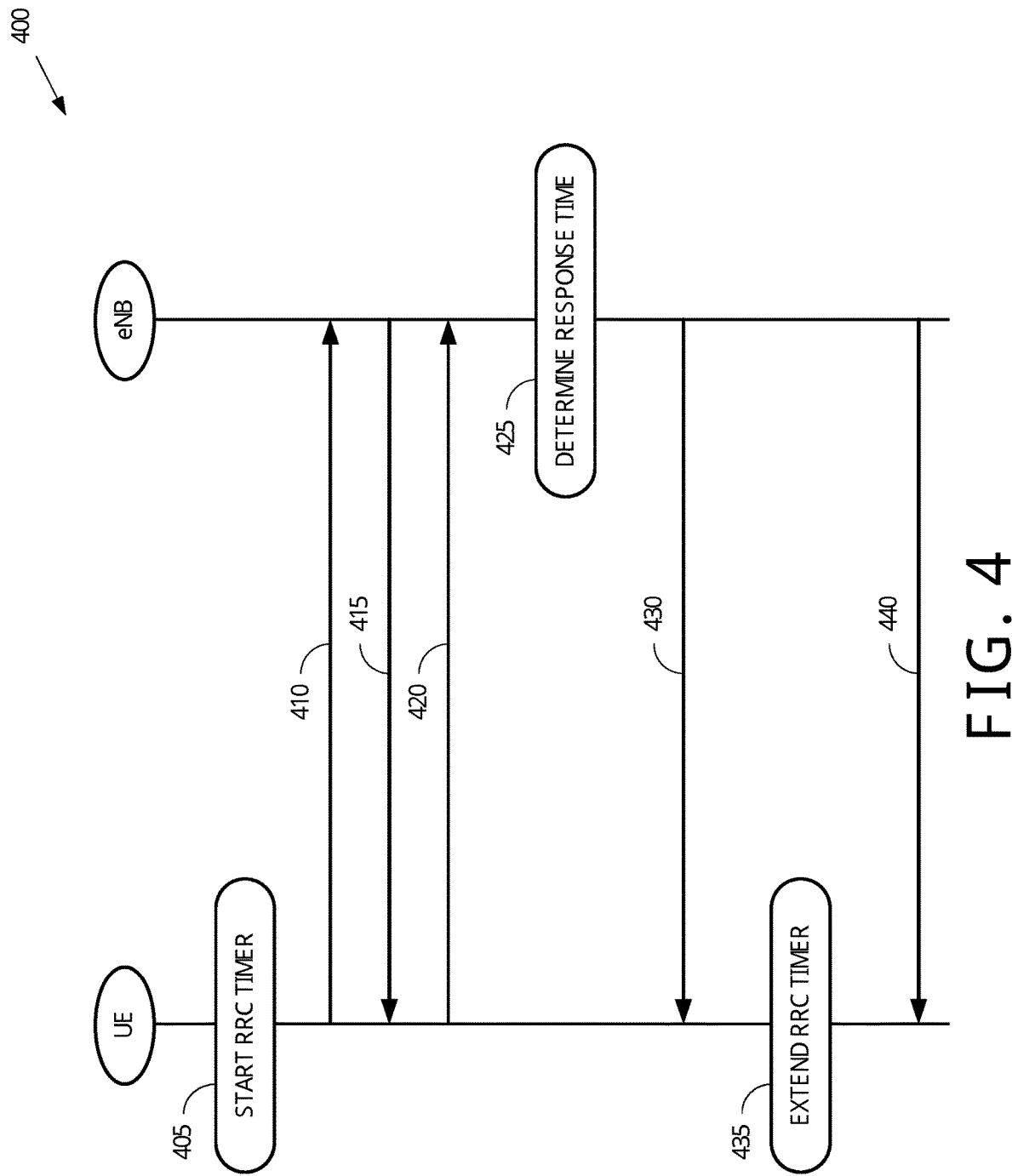
FIG. 4 is a message exchange between entities in a wireless communication system that implements EDT including acknowledgment messages that indicate extended time intervals according to some embodiments.

FIG. 4 is a message exchange 400 between entities in a wireless communication system that implements EDT including acknowledgment messages that indicate extended time intervals according to some embodiments. The message exchange 400 is implemented a wireless communication system such as some embodiments of the wireless communication system 100 shown in FIG. 1. The wireless communication system includes a user equipment (UE) and a base station (eNB).

The user equipment starts an RRC timer at block 405 in conjunction with transmitting a random-access preamble 410 to the base station to request service from the base station. In response to receiving the random-access preamble 410, the base station transmits a random-access response 415 to the user equipment, which transmits an RRC connection resume request 420 to the base station. The request 420 includes uplink data for transmission to the network by the base station in accordance with EDT.

At block 425, the base station determines a response time required to service the request 420. If the base station has (or has substantially immediate access to) the resources needed to service the request 420, the base station determines that the response time is within the default time interval of the RRC timer implemented in the user equipment. If the base station does not have (or is required to retrieve) the resources needed to service the request 420, the base station determines that the response time is longer than the default time interval of the RRC timer.

The base station transmits a provisional acknowledgment 430 to the user equipment. If the base station determines that it is not able to service the request within the default time interval, the provisional acknowledgment 430 includes information indicating an extended time interval for the RRC timer. In some embodiments, the extended time interval is indicated by one or more of an indication of a new value of the RRC timer that is to replace the default value of the RRC timer, an offset that is added to increment the default value of the RRC timer, or a multiplier that is applied to the value of the RRC timer. Some embodiments of the provisional acknowledgment 430 include information indicating that the user equipment is to release the connection and wait for a reconnection after a time interval indicated in the provisional acknowledgment 430.

The user equipment extends (at block 435) the RRC timer based on the information indicating the extended time interval received in the provisional acknowledgment 430. Thus, the user equipment selectively increases the time interval that the user equipment waits to receive an acknowledgment that the request to transmit the uplink data is serviced by the base station. The base station transmits an RRC connection release 440 to the user equipment. The release 440 includes an acknowledgment that the uplink data has been received and the base station is transmitting the uplink data to the network.

Figure 5:
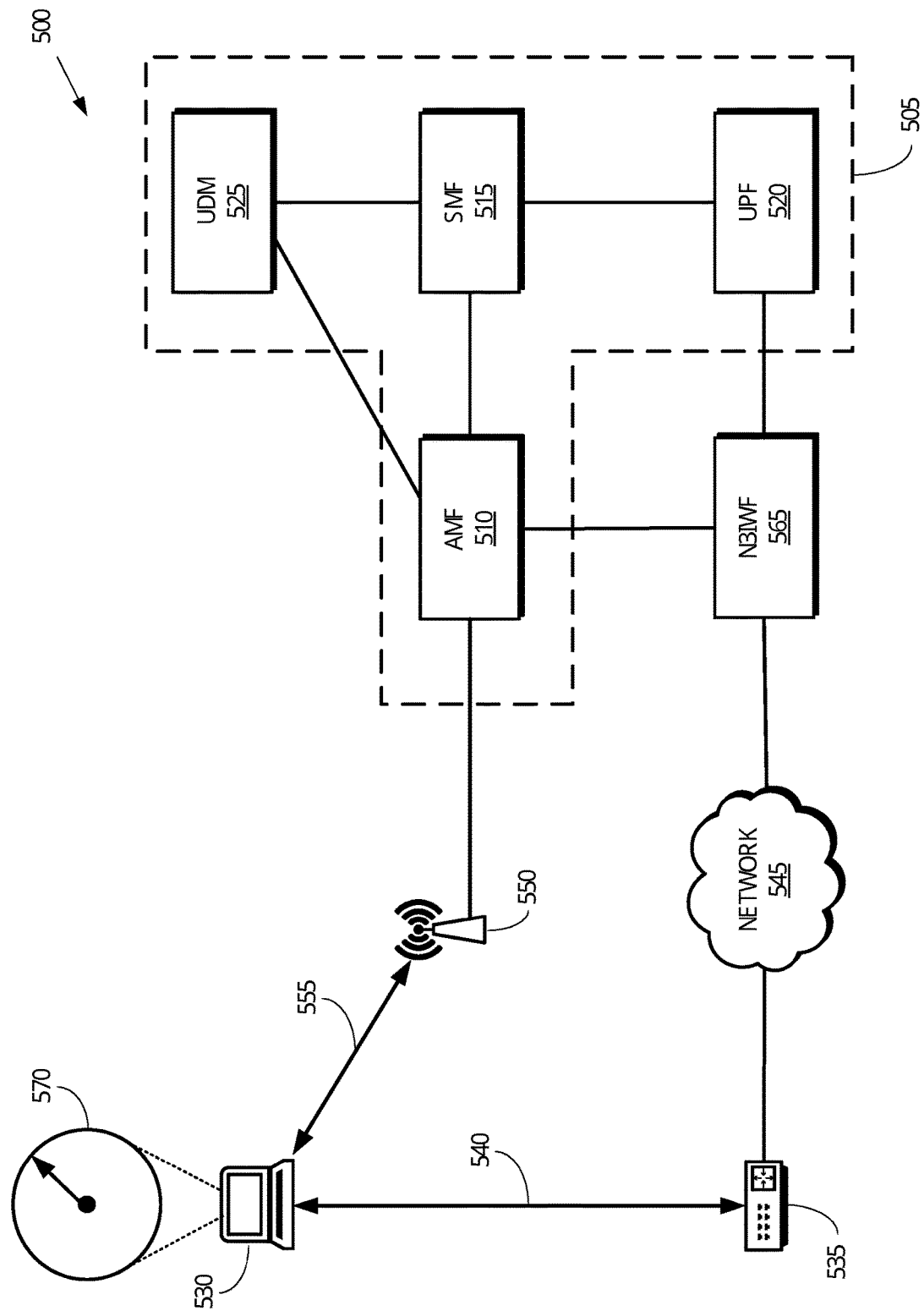
FIG. 5 is a block diagram of a communication system that supports selectively transmitting NAS containers via 3GPP access or non-3GPP access according to some embodiments.

FIG. 5 is a block diagram of a communication system 500 that supports selectively transmitting NAS containers via 3GPP access or non-3GPP access according to some embodiments. The communication system 500 provides support for both mobile and fixed access. As used herein, the term "mobile access" refers to accessing a communication system (e.g., the communication system 500) over an air interface. Mobile access can therefore be referred to as wireless access, mobile communication, wireless communication, or referred to with other similar terms. The term "fixed access" refers to accessing to a communication system using a device that is physically connected to the communication system, e.g., accessing a communication system such as the communication system 500 via wires, optical fibers, and the like. Fixed access can therefore be referred to as wireline access, wired communication, or referred to with other similar terms. The communication system 500 supports hybrid access that allows devices to concurrently access the communication system 500 using mobile access and fixed access. Some embodiments of the communication system 500 support 3GPP radio access and non-3GPP (wireless or fixed) access on an equal footing. User equipment will therefore be able to perform dual access by connecting to the 5G core network via concurrent 3GPP radio access and non-3GPP (wireless or fixed) access.

The communication system 500 includes a core network 505 that is accessible by either mobile or fixed devices using a common user plane access and a control plane that supports common authentication, authorization, and accounting (AAA) and policy control. The core network 505 includes an access and mobility management function (AMF) 510 that manages access control and mobility for devices in the communication system 500. The core network 505 also includes a session management function (SMF) 515 to set up and manage sessions in the communication system 500 according to network policies. An association between user equipment and the core network 505 can be represented as a packet data unit (PDU) session that can be managed by the SMF 515. The PDU session supports data connectivity between user equipment and a data network. The SMF 515 generates messages including NAS containers for transmission to the AMF 510.

The core network 505 also includes one or more user plane functions (UPFs) 520 that are deployed in the communication system 500 to provide services to users of the communication system 500. The core network 505 further includes a unified data manager (UDM) 525 that processes credentials, location management, subscription management, and the like. The UDM 525 stores data including user subscription data, such as subscription identifiers, security credentials, access and mobility related subscription data, and session related subscription data. Some embodiments of the core network 505 include other functionality such as a policy control function and a network function repository function, which are not shown in FIG. 5 in the interest of clarity. Some embodiments of the core network 505 are implemented using network function virtualization and software defined networking, as discussed herein. For example, different network slices can be used to instantiate different instances of the AMF 510, the SMF 515, the UPF 520, or the UDM 525 for different users or devices. Each PDU session is part of one network slice.

In the illustrated embodiment, a user equipment 530 has a wireless connection 540 to an access point 535. The wireless connection 540 is a non-3GPP access type such as a Wi-Fi connection. The access point 535 has a wired (non-3GPP) connection to network 545 that is capable of carrying IP traffic such as an Ethernet network. Some embodiments of the wired connection use line termination devices such as a digital subscriber line access multiplexer (DSLAM) or a gigabit passive optical network (GPON). The communication system 500 therefore provides the user equipment 530 with access to the core network 505 via a non-3GPP access type.

The communication system 500 also provides the user equipment 530 with mobile access to the core network 505, e.g., via a radio access network 550 that is connected to the AMF 510 over a corresponding interface such as an N2 interface. The radio access network 550 is connected to the UPF 520 by a corresponding interface such as an N3 interface, which is not shown in FIG. 5 in the interest of clarity. The radio access network 550 provides wireless connectivity to the user equipment 530 via a wireless connection 555. The wireless connection 555 provides wireless connectivity according to a 3GPP access type.

An interworking function 565 is disposed between the network 540 and the core network 505. The interworking function 565 can also be referred to as a non-3GPP interworking function (N3IWF) because the interworking function 565 is used to connect the core network 505 to the access point that provides connectivity via non-3GPP access types. The interworking function 565 is configured to modify or translate messages conveyed from the fixed access user equipment to the core network 505 so that the fixed access user equipment appears to be accessing the core network 505 according to 3GPP standards or protocols from the perspective of the core network 505. The interworking function 565 is also configured to modify or translate messages conveyed from the core network 505 to the fixed access user equipment so that the messages received by the fixed access user equipment conform to corresponding non- 3GPP standards or protocols. The interworking function 565 supports interfaces with the AMF 510 and the UPF 520.

The SMF 515 generates NAS containers and transmits the NAS containers to the AMF 510 in NAS messages. As used herein, an NAS layer is understood to be a protocol layer implemented in wireless communication protocol stacks between user equipment 530 and the core network 505. The NAS layer is the highest stratum of the control plane between the user equipment 530 and a mobility management entity (MME) or the AMF 510 at the radio interface. The NAS layer manages the establishment of communication sessions and maintains continuous communication as the user equipment moves through the network. Examples of functions supported by the NAS protocols include mobility of the user equipment 530 and session management procedures that are used to establish and maintain connectivity between the user equipment and a packet data network via the mobile data network. In contrast, an access stratum (AS) layer and corresponding AS protocol are used to convey information over an air interface in the wireless portion of the network. The NAS protocol is transported using radio resource control (RRC) messages in Second Generation (2G), Third Generation (3G), Fourth Generation (4G), and 5G networks that operate according to the standards defined by the Third Generation Partnership Project (3GPP).

One or more NAS links are used to convey NAS messages between the user equipment 530 and the AMF 510, which are the terminating endpoints of the NAS links. The user equipment 530 can therefore communicate with the core network 505 using NAS messages that are conveyed via a first NAS link that traverses the access point 535. Some embodiments of the user equipment 530 support multiple concurrent NAS links with the AMF 510. For example, the user equipment 530 and the AMF 510 can concurrently support a mobile NAS link and a non-3GPP NAS link. Prior to establishing an NAS link, the user equipment 530 transmits an NAS registration message to register with the AMF 510. The NAS registration message can include information that is used to perform authorization (and, in some cases, authentication) of the user equipment. Registration of the user equipment with the AMF 510 also includes generating or provisioning an encryption key and an integrity key for the user equipment and the AMF 510. The encryption key and the integrity key are used to provide secure SMS messaging over the NAS link.

The communication system 500 supports connectionless data transmission, e.g. according to the standards set forth in 3GPP TR 23.724, which is incorporated herein by reference in its entirety. The user equipment 530 initiates connectionless data transmission by transmitting a request including the connectionless data to the radio access network 550, which responds with an acknowledgment message and then begins establishing a data path for the uplink traffic that carries the connectionless data. The response time for the radio access network 550 depends on whether the radio access network 550 already has access to the necessary resources. For example, if the radio access network 550 previously stored context for the user equipment 530 (e.g., based on a previous communication with user equipment 530), the radio access network 550 responds substantially immediately to the request from the user equipment 530. However, if the radio access network 550 does not have a stored copy of the context or requires other resources to establish the uplink data path, the response time is significantly longer.

The user equipment 530 implements (or has access to) one or more timers 570 that are configured to measure (either by counting up or counting down) a configured time interval. Some embodiments of the user equipment 530 configure a timer 570 (which is also referred to as a guard timer herein) to measure a default time interval and the timer 570 begins measuring the default time interval in response to the user equipment 530 transmitting the connectionless data to the radio access network 550. The value of the default time interval is determined based on an estimated response time assuming that the radio access network 550 has access to the context or other resources required to service the request to transmit the connectionless data. The timer 570 may therefore expire prior to the user equipment 530 receiving the acknowledgment from the radio access network 550 if the radio access network 550 needs to reestablish a context for the user equipment 530 or request resources from another node in the communication system 500. For example, the round trip time needed to retrieve the context from another node can be longer than the default time interval. In some embodiments, the radio access network 550 abandons or removes a stored context for the user equipment 530 in response to a validity timer expiring.

At least in part to address these drawbacks, the radio access network 550 determines whether a request from the user equipment 530 to transmit connectionless data is serviceable within the default time interval. If the radio access network 550 has access to the required resources, the radio access network 550 determines that the request is serviceable within the default time interval and transmits an acknowledgment to the user equipment 530. However, if the radio access network 550 determines that the request is not serviceable within the default time interval, e.g., because the radio access network 550 needs to request resources from another node in the network, the radio access network 550 transmits an acknowledgment that includes information indicating an extended time interval that is needed to successfully complete the request. The extended time interval is longer than the default time interval and is indicated to the user equipment 530 in a variety of ways, as discussed herein. In response to receiving the acknowledgment including the information indicating the extended time interval, the user equipment 530 modifies the timer 570 to increase the time interval measured by the timer 570 from the default time interval to the extended time interval.

Figure 6:
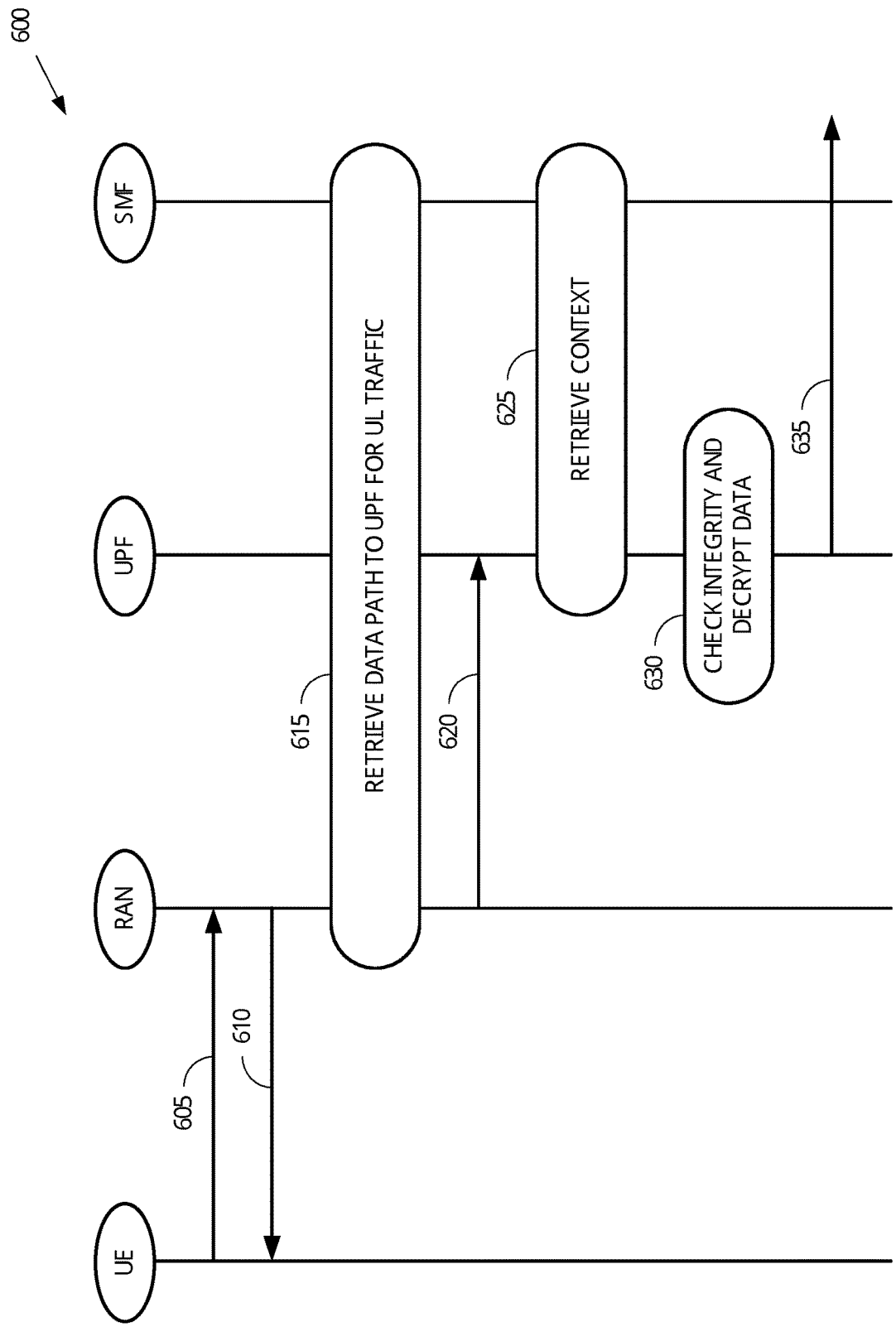
FIG. 6 is a message exchange between entities in a communication system that supports connectionless data transmission according to some embodiments.

FIG. 6 is a message exchange 600 between entities in a communication system that supports connectionless data transmission. The message exchange 600 is implemented a communication system such as some embodiments of the communication system 500 shown in FIG. 5. The communication system includes a UE, a RAN, a UPF, and an SMF.

The user equipment transmits a request 605 including connectionless data to the radio access network, which responds with an acknowledgment 610 to acknowledge receipt of the request. At this point, the radio access network does not know whether the request is serviceable within a default time interval or not. Nevertheless, a timer in the user equipment begins counting down a default time interval in response to transmitting the request 605.

The radio access network retrieves configuration information for a data path to the UPF using signaling 615 exchanged between the radio access network, the UPF, and the SMF. As noted above, the radio access network cannot tell whether the attempt to retrieve the UPF data path information is going to be successful or not. Thus, the acknowledgment 610 cannot provide information indicating whether the attempt will be successful and therefore whether the request 605 is serviceable within the default time interval. The radio access network could overcome this problem by delaying the acknowledgment 610 until after the signaling 615 is complete. However, this approach creates a different problem because the user equipment will then be unaware of whether to apply the default time interval while waiting for the acknowledgment 610, which could take a significantly longer amount of time if the signaling 615 requires data retrieval from another node.

Once the uplink data path is established, the radio access network transmits the connectionless data in a message 620 to the UPF. If the UPF does not have a context stored for the user equipment, the UPF retrieves the context from the SMF using signaling 625. The UPF performs an integrity check and decrypts the data based on the user equipment context at block 630. If the integrity check is successful, the UPF transmits the connectionless data to the network in the message 635.

Figure 7:
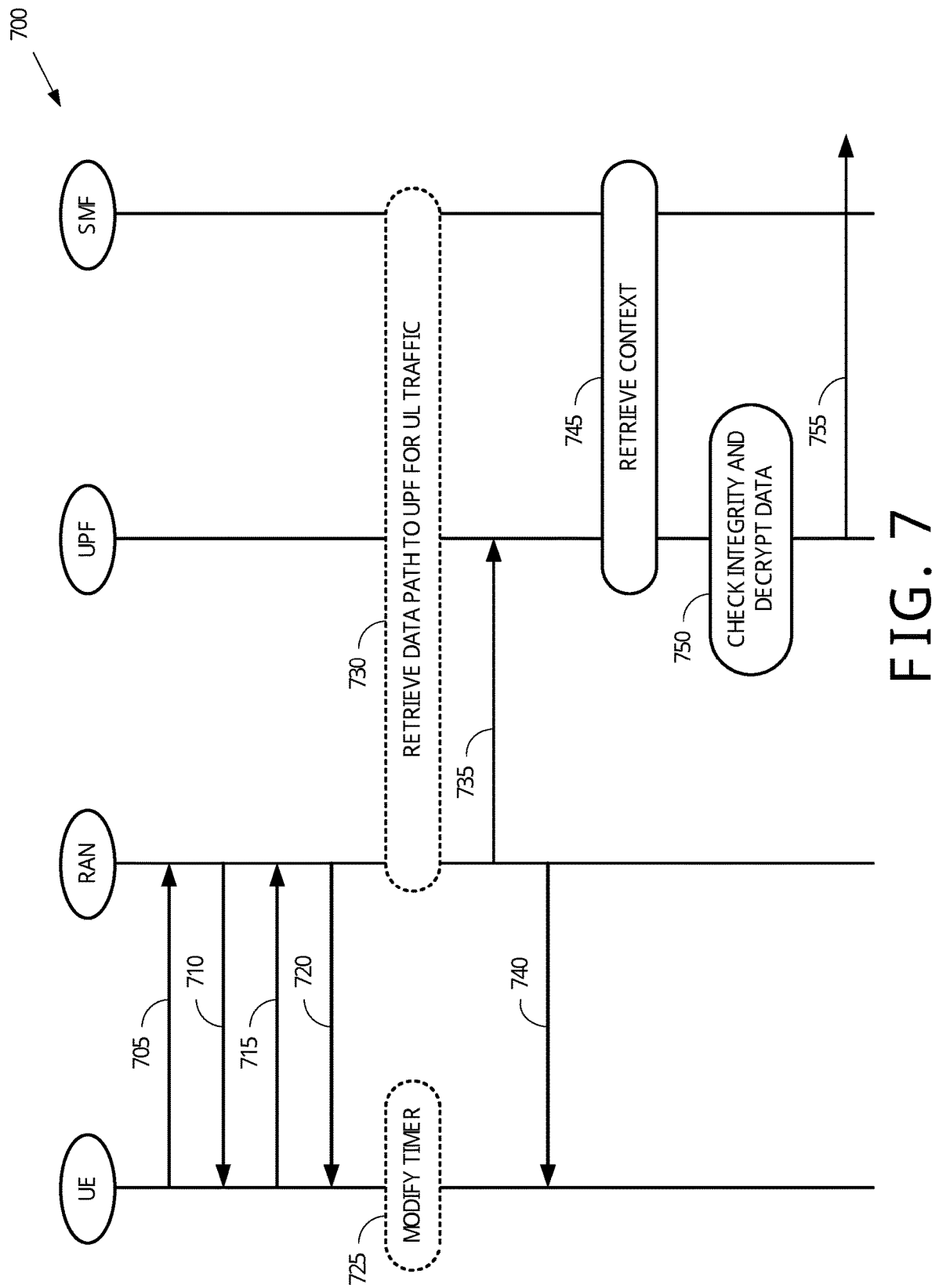
FIG. 7 is a message exchange between entities in a communication system that supports transmitting acknowledgments of requests for connectionless data transmission according to some embodiments.

FIG. 7 is a message exchange 700 between entities in a communication system that supports transmitting acknowledgments of requests for connectionless data transmission. The message exchange 700 is implemented a communication system such as some embodiments of the communication system 500 shown in FIG. 5. The communication system includes a UE, a RAN, a UPF, and an SMF.

The user equipment starts a guard timer in conjunction with transmitting a random-access preamble 705 to the radio access network to request service from the radio access network. The guard timer is initially configured with a default time interval and the guard timer expires after the default time interval. In response to receiving the random-access preamble 705, the radio access network transmits a random-access response 710 to the user equipment. The user equipment then sends connectionless data 715 for transmission on the uplink such as RRC connectionless data with an identifier of the uplink connectionless service (UCLSI).

The radio access network responds substantially immediately to reception of the connectionless data 715 by transmitting a provisional acknowledgment 720 that indicates that the radio access network has successfully received the connectionless data 715 over the radio interface. The provisional acknowledgment 720 does not indicate that the connectionless data 715 has been successfully transferred to the network. The radio access network uses resources including an uplink data path to the UPF to transfer the connectionless data 715 to the network. The radio access network can successfully transfer the data within the default time interval if the radio access network has the uplink data path corresponding to the UCSLI of the connectionless data 715. In that case, the provisional acknowledgment 720 does not include information indicating an extended time interval. If the radio access network does not have the resources, such as the uplink data path corresponding to the UCLSI, needed to transfer the connectionless data 715, the provisional acknowledgment 720 includes information indicating an extended time interval to dynamically assign a longer time interval to the user equipment.

In the event that the provisional acknowledgment 720 includes the information indicating the extended time interval, the user equipment modifies (at block 725) the guard timer based on the information. Modifying the guard timer can include replacing the default time interval with the extended time interval and restarting the guard timer, increasing the guard timer duration by an offset, multiplying the value of the guard timer by a scale factor, and the like. The user equipment therefore waits for a longer time corresponding to the extended time interval before the guard timer expires, which gives the radio access network additional time to acquire resources such as the uplink data path corresponding to the UCLSI. The radio access network retrieves (at block 730) the path to the UPF from the core network to determine a destination for the connectionless data 715 received from the user equipment.

The operations at block 725, 730 are not performed in all cases, e.g., in the event that the provisional acknowledgment 720 does not include information indicating an extended time interval because the radio access network is able to service the request substantially immediately.

The radio access network transmits the connectionless data in a message 735 using the uplink data path to the UPF that is associated with the UCLSI received from the user equipment with the connectionless data 715. In response to transmitting the message 735, the radio access network transmits a response 740 to inform the user equipment that the connectionless data 715 was successfully transmitted from the radio access network. The message 740 completes the RRC signaling between the user equipment and the radio access network. A release cause in the message 740 indicates the outcome of the procedure based on matching the UCLSI received from the user equipment with the connectionless data 715 or based on the transport protocol response for the message 735.

If the UPF does not have a context stored for the user equipment, the UPF retrieves the context from the SMF using signaling 745. The UPF performs an integrity check and decrypts the data based on the user equipment context at block 750. If the integrity check is successful, the UPF transmits the connectionless data to the network in the message 755.

Thus, the message exchange 700 allows the serving radio access network to issue a provisional acknowledgment with a dynamically allocated extended time interval for the guard timer that supervises the signaling procedure at the user equipment. If the user equipment is waiting for a rapid response and the guard timer is running with the default time interval, the user equipment restarts the guard timer with the extended time interval, adds additional time to the guard timer, or multiplies the value of the guard timer by a scaling factor if the provisional acknowledgment indicates a longer time interval. Otherwise, the user equipment continues to operate based on the guard timer configured with the default time interval. The behavior of the user equipment in response to expiration of the guard timer is the same regardless of whether the user equipment is using the default time interval or an extended time interval, i.e., expiration of the guard timer indicates a timeout failure.

Some embodiments of the UPF applies the same principle when resolving the data packet path towards an Application Server (AS). If the UPF (or another network function) already holds the AS context, then it need not increase the default time interval for the procedure. But if the UPF needs to retrieve the context in order to carry out the action, then the UPF instructs the radio access network to transmit a provisional response to the user equipment to indicate an extended time interval. In some embodiments, the 3GPP network edge between the service capability exposure function (SCEF) and a service capability server (SCS)/AS in evolved packet System (EPS) and network exposure function (NEF) and application function (AF) in 5G architecture. As discussed herein, if a serving node needs more time to carry out a request received from a requesting node, then the serving node dynamically provides an extended time interval during the ongoing procedure.

Figure 8:
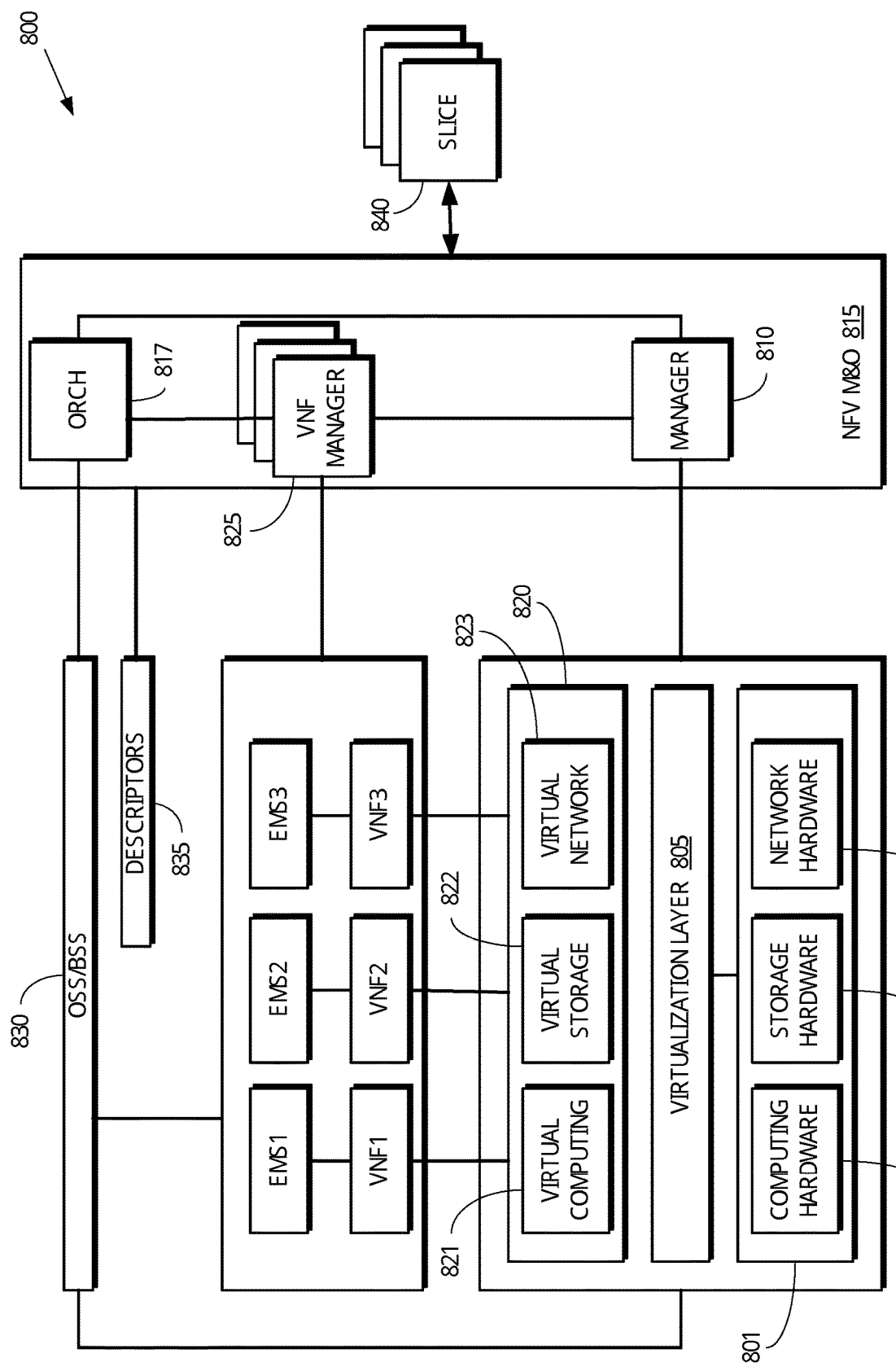
FIG. 8 is a block diagram of a network function virtualization (NFV) architecture according to some embodiments.

FIG. 8 is a block diagram of a network function virtualization (NFV) architecture 800 according to some embodiments. The NFV architecture 800 is used to implement some embodiments of the communication system 100 shown in FIG. 1 and the communication system 300 shown in FIG. 3. The NFV architecture 800 includes hardware resources 801 including computing hardware 802 such as one or more processors or other processing units, storage hardware 803 such as one or more memories, and network hardware 804 such as one or more transmitters, receivers, or transceivers. A virtualization layer 805 provides an abstract representation of the hardware resources 801. The abstract representation supported by the virtualization layer 805 can be managed using a virtualized infrastructure manager 810, which is part of the NFV management and orchestration (M&O) module 815. Some embodiments of the virtualized infrastructure manager 810 are configured to collect and forward performance measurements and events that may occur in the NFV architecture 800. For example, performance measurements may be forwarded to an orchestrator (ORCH) 817 implemented in the NFV M&O 815. The hardware resources 801 and the virtualization layer 805 may be used to implement virtual resources 820 including virtual computing 821, virtual storage 822, and virtual networking 823.

Virtual networking functions (VNF1, VNF2, VNF3) run over the NFV infrastructure (e.g., the hardware resources 801) and utilize the virtual resources 820. For example, the virtual networking functions (VNF1, VNF2, VNF3) may be implemented using virtual machines supported by the virtual computing resources 821, virtual memory supported by the virtual storage resources 822, or virtual networks supported by the virtual network resources 823. Element management systems (EMS1, EMS2, EMS3) are responsible for managing the virtual networking functions (VNF1, VNF2, VNF3). For example, the element management systems (EMS1, EMS2, EMS3) may be responsible for fault and performance management. In some embodiments, each of the virtual networking functions (VNF1, VNF2, VNF3) is controlled by a corresponding VNF manager 825 that exchanges information and coordinates actions with the virtualized infrastructure manager 810 or the orchestrator 817.

The NFV architecture 800 may include an operation support system (OSS)/business support system (BSS) 830. The OSS/BSS 830 deals with network management including fault management using the OSS functionality. The OSS/BSS 830 also deals with customer and product management using the BSS functionality. Some embodiments of the NFV architecture 800 use a set of descriptors 835 for storing descriptions of services, virtual network functions, or infrastructure supported by the NFV architecture 800. Information in the descriptors 835 may be updated or modified by the NFV M&O 815.

The NFV architecture 800 can be used to implement network slices 840 that provide user plane or control plane functions. A network slice 840 is a complete logical network that provides communication services and network capabilities, which can vary from slice to slice. User equipment can concurrently access multiple network slices 840. Some embodiments of user equipment provide Network Slice Selection Assistance Information (NSSAI) parameters to the network to assist in selection of a slice instance for the user equipment. A single NSSAI may lead to the selection of several network slices 840. The NFV architecture 800 can also use device capabilities, subscription information and local operator policies to do the selection. An NSSAI is a collection of smaller components, Single-NSSAIs (S-NSSAI), which each include a Slice Service Type (SST) and possibly a Slice Differentiator (SD). Slice service type refers to an expected network behavior in terms of features and services (e.g., specialized for broadband or massive IoT), while the slice differentiator can help selecting among several network slice instances of the same type, e.g. to isolate traffic related to different services into different network slices 840.

Although the NFV architecture 800 provides flexibility for establishing or migrating functions, initiating or migrating a service or a function takes time and the NFV architecture 800 is not always able to respond immediately to service requests. For example, some services provided by the NFV architecture 800 are established on demand and the services can be latency-critical services such as uRLLC services that require edge processing. The latency critical service can be migrated on demand by exploiting the virtual machines or containers implemented in the NFV architecture 800. The time required to identify the resources and migrate the service in the NFV architecture 800 ranges upwards from seconds to longer time intervals, depending on the virtualization technique and the size of the application. Consequently, timers such as guard timers or RRC timers implemented in user equipment that are configured to expire after a default time interval can lead to failure to establish or migrate the virtual service if the time required to identify and acquire the necessary resources is longer than the default time interval.

At least in part to address this drawback in the conventional practice, some embodiments of the NFV architecture 800 are configured to provide information indicating delayed establishment (or migration) in response to the request to establish or migrate a service. The information can include a message indicating that "service set up is in progress" or information indicating an extended time interval that is dynamically adjusted during the ongoing procedure. The NFV architecture 800 therefore determines whether the request is serviceable within the default time interval or requires the extended time interval to complete. The NFV architecture 800 transmits the message indicating the extended time interval in response to the NFV architecture 800 determining that the request requires the extended time interval.

Some embodiments of the techniques disclosed herein provide a number of advantages over the conventional practice. Especially at radio interface, it is important to keep the RRC Connection as short as possible without losing any useful data communication. This requires a dynamic approach to signalling procedure guard timer handling. When the response time is expected to be short, it is beneficial to run a short timer so that the timer expiry can release resources from the failing procedure and make the resources available for something more useful. Simply extending all timer values leads to excessively long timer values waste shared system resources due to late detection of failures. The techniques disclosed herein therefore use a relatively short default time interval when possible. However, the relatively short duration of the default time interval does not allow dynamic retrieval of some required resourced from the other nodes, as the round trip time might cause the guard timer to expire in the originating end. Extended time intervals are therefore dynamically assigned when a longer timer value is necessary due to predicted longer than usual response times.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

As used herein, the term "circuitry" may refer to one or more or all of the following:
(a) hardware-only circuit implementations (such as implementations and only analog and/or digital circuitry) and
(b) combinations of hardware circuits and software, such as (as applicable):
  (i) a combination of analog and/or digital hardware circuit(s) with software/firmware and
  (ii) any portions of a hardware processor(s) with software (including digital signal processor(s), software, and memory(ies) that work together to cause an apparatus, such as a mobile phone or server, to perform various functions) and
(c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
   at least one processor; and
   at least one memory including computer program code;
   the at least one memory and the computer program code configured to, with the at least one processor, cause the apparatus at least to perform:
   receiving, from a user equipment, a request to establish a service to a base station;
   determining, in response to receiving the request, whether the request is serviceable within a default time interval, wherein determining comprises:
     determining that congestion is present in a network including the base station,
     determining that additional resources are necessary to service the request, and
     calculating a time required to identify the additional resources and migrate the service in network function virtualization (NFV) architecture based on virtualization technique and size of application; and
   transmitting an acknowledgment comprising information indicating an extended time interval in response to the base station determining that the extended time interval is needed to successfully complete the request.

2. The apparatus according to claim 1, further comprising: a memory to store configuration information, and wherein the at least one memory and the computer program code are configured to, with the at least one processor, cause the apparatus at least to determine whether the request is serviceable within the default time interval by determining whether the memory has stored configuration information that is used to service the request.

3. The apparatus according to claim 2, wherein the configuration information comprises state information that defines a data path to a user plane function.

4. The apparatus according to claim 1, wherein the at least one memory and the computer program code are configured to, with the at least one processor, cause the apparatus at least to determine whether the request is serviceable within the default time interval by determining whether data is to be retrieved from another network entity to service the request.

5. The apparatus according to claim 1, wherein the at least one memory and the computer program code are configured to, with the at least one processor, cause the apparatus at least to perform transmitting the acknowledgment comprising at least one of a notification that the servicing of the request is in progress, information that is used to set or modify a value of a timer implemented in the user equipment, and information indicating that the base station will subsequently transmit a notification to the user equipment when the base station is ready to service the request.

6. The apparatus according to claim 5, wherein the information indicating the extended time interval includes at least one of an indication of a new value of a timer implemented in the user equipment that is to replace a default value of the timer, an offset that is added to increment the default value of the timer, a multiplier that is applied to a value of the timer, and information indicating that the user equipment is to release a requested connection and wait for a reconnection after a time interval.

7. The apparatus according to claim 6, wherein the at least one memory and the computer program code are further configured to, with the at least one processor, cause the apparatus to transmit an acknowledgment indicating the default time interval in response to the processor determining that the request will be completed within the default time interval and to perform within the default time interval.

8. The apparatus of claim 1, wherein the apparatus is implemented in the base station.

9. The apparatus of claim 1, wherein the apparatus is the base station.

10. An apparatus comprising:
at least one processor; and
at least one memory including computer program code;
the at least one memory and the computer program code configured to, with the at least one processor, cause the apparatus at least to perform:
transmitting a request to establish a service to a base station;
receiving an acknowledgment comprising information indicating an extended time interval in response to the base station determining that the extended time interval is needed to successfully complete the request, wherein determining comprises:
determining that congestion is present in a network including the base station,
determining that additional resources are necessary to service the request, and
calculating a time required to identify the additional resources and migrate the service in network function virtualization (NFV) architecture based on virtualization technique and size of application; and
configuring a timer to start and run for a default time in response to transmission of the request, wherein the timer is modified in response to receiving the information indicating the extended time interval.

11. The apparatus according to claim 10, wherein the timer is modified in response to configuration information that is used to service the request not being stored in the base station.

12. The apparatus according to claim 11, wherein the configuration information comprises of state information that defines a data path to a user plane function.

13. The apparatus according to claim 10, wherein the timer is modified in response to the base station determining that congestion is present in a network including the base station or additional resources are necessary to service the request.

14. The apparatus according to claim 10, wherein the timer is modified in response to the base station determining that data is to be retrieved from another network entity to service the request.

15. The apparatus according to claim 10, wherein the at least one memory and the computer program code are configured to, with the at least one processor, cause the apparatus at least to perform: receiving the acknowledgment comprising at least one of a notification that the servicing of the request is in progress, information that is used to set or modify a value of a timer implemented in the apparatus, and information indicating that the base station will subsequently transmit a notification to the apparatus when the base station is ready to service the request.

16. The apparatus according to claim 10, wherein the information indicating the extended time interval includes at least one of an indication of a new value of the timer that is to replace a default value of the timer, an offset that is added to increment the default value of the timer, a multiplier that is applied to a value of the timer, and information indicating that the apparatus is to release a requested connection and wait for a reconnection after a time interval.

17. The apparatus according to claim 10, wherein the at least one memory and the computer program code are configured to, with the at least one processor at least to perform: receiving an acknowledgment indicating a default time interval in response to determining that the request will be completed within a default time interval.

18. The apparatus of claim 10, wherein the apparatus is implemented in a user equipment.

19. The apparatus of claim 10, wherein the apparatus is a user equipment.

* * * * *